(12) United States Patent
Jiang

(10) Patent No.: US 7,325,111 B1
(45) Date of Patent: Jan. 29, 2008

(54) METHOD AND SYSTEM FOR SINGLE PASS VOLUME SCANNING FOR MULTIPLE DESTINATION MIRRORING

(75) Inventor: Tianyu Jiang, Export, PA (US)

(73) Assignee: Network Appliance, Inc., Sunnyvale, CA (US)

( * ) Notice: Subject to any disclaimer, the term of this patent is extended or adjusted under 35 U.S.C. 154(b) by 247 days.

(21) Appl. No.: 11/264,837

(22) Filed: Nov. 1, 2005

(51) Int. Cl.
*G06F 12/00* (2006.01)

(52) U.S. Cl. ............... 711/162; 711/111; 711/112; 711/114; 707/204

(58) Field of Classification Search ............ 711/111, 711/112, 114, 160, 161, 162; 707/204
See application file for complete search history.

(56) References Cited

U.S. PATENT DOCUMENTS

| | | | | |
|---|---|---|---|---|
| 5,819,292 | A * | 10/1998 | Hitz et al. ............... | 707/203 |
| 6,993,539 | B2 * | 1/2006 | Federwisch et al. ...... | 707/201 |
| 7,010,553 | B2 * | 3/2006 | Chen et al. ............... | 707/203 |
| 2002/0116593 | A1 * | 8/2002 | Kazar et al. ............. | 711/202 |
| 2004/0250033 | A1 * | 12/2004 | Prahlad et al. .......... | 711/162 |
| 2005/0192932 | A1 * | 9/2005 | Kazar et al. ............. | 707/1 |
| 2005/0246401 | A1 * | 11/2005 | Edwards et al. ......... | 707/205 |
| 2006/0085613 | A1 * | 4/2006 | Mimatsu et al. ......... | 711/162 |
| 2006/0168411 | A1 * | 7/2006 | Ohno et al. ............. | 711/162 |
| 2007/0094467 | A1 * | 4/2007 | Yamasaki ............... | 711/162 |

* cited by examiner

*Primary Examiner*—Jack Lane
(74) *Attorney, Agent, or Firm*—Cesari and McKenna, LLP

(57) ABSTRACT

A mirroring application running on a primary server in a multiple destination mirroring environment is provided. The mirroring application configures a scanner with snapshots that are registered. The scanner calculates a logical age for each snapshot. The scanner scans a flexible volume once for data blocks that are newer than a predetermined snapshot. The scanner tags each such block with a logical age that is equivalent to the oldest snapshot that refers to that block. The scanner loads the tagged blocks in a queue. A sender module associated with each destination in the mirroring environment inspects blocks in the queue and retrieves only those blocks younger than a destination reference snapshot. The sender sends those blocks to the destination and filters out older blocks, thus bringing the destination mirror up to date with the current active file system.

23 Claims, 13 Drawing Sheets

400 →

| CF PROTOCOL | 410 |
| RC | 408 |
| UDP | 406 |
| IP | 404 |
| MEDIA ACCESS | 402 |

| SVS ID 502 | INODE NUMBER 504 | UNIQUE-IFIER 506 | STRIPED FLAG 508 | STRIPING EPOCH NUMBER 510 |

FIG. 5

METHOD AND SYSTEM FOR SINGLE PASS VOLUME SCANNING FOR MULTIPLE DESTINATION MIRRORING

BACKGROUND OF THE INVENTION

1. Field of the Invention

The present invention relates to a distributed cluster computer environment and, more particularly, to multiple destination mirroring in such an environment.

2. Background Information

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system environment configured to service many clients. Each storage system may be configured to service one or more volumes, wherein each volume stores one or more data containers. Yet often a large number of data access requests issued by the clients may be directed to a small number of data containers serviced by a particular storage system of the environment. A solution to such a problem is to distribute the volumes serviced by the particular storage system among all of the storage systems of the environment. This, in turn, distributes the data access requests, along with the processing resources needed to service such requests, among all of the storage systems, thereby reducing the individual processing load on each storage system.

In order to improve reliability and to facilitate disaster recover in the event of a failure in a distributed system, it is common to "mirror," i.e., replicate, some or all of the underlying data and/or the file system that organizes that data from a source volume associated with a primary storage system or server to one or more remote storage destinations. To that end, a mirror of the source volume is established and stored as a destination volume at a remote site, making it more likely that recovery is possible in a disaster that may physically damage the main storage location or infrastructure (e.g. floods, power outage, act of war, etc.). The mirror is updated at regular intervals, typically by an administrator in an effort to reproduce the most recent changes to the volume.

The inherent Snapshot™ capabilities of the exemplary WAFL file system are further described in *TR3002 File System Design for an NFS File Server Appliance* by David Hitz et al., published by Network Appliance, Inc., which is hereby incorporated by reference as though fully set forth herein. Further details are provided in commonly owned U.S. patent application Ser. No. 10/100,967, entitled SYSTEM AND METHOD FOR DETERMINING CHANGES IN TWO SNAPSHOTS AND FOR TRANSMITTING CHANGES TO A DESTINATION SNAPSHOT, filed on Mar. 19, 2002, which is hereby incorporated by reference as though fully set forth herein.

It is noted that "Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other unique identifier that distinguishes it from other PCPIs taken at other points in time. A PCPI can also include other information (metadata) about the active file system at the particular point in time for which the image is taken. The terms "PCPI" and "snapshot" shall be used interchangeably through out this patent without derogation of Network Appliance's trademark rights.

Snapshots are generally created on some regular schedule. This schedule is subject to great variation. In addition, the number of snapshots retained by the filer is highly variable. Under one storage scheme, a number of recent snapshots are stored in succession (for example, a few days worth of snapshots each taken at four-hour intervals), and a number of older snapshots are retained at increasing time spacings (for example, a number of daily snapshots for the previous week(s) and weekly snapshot for the previous few months). The snapshot is stored on-disk along with the active file system, and is called into the buffer cache of the filer memory as requested by the storage operating system or other application. However, it is contemplated that a variety of snapshot creation techniques and timing schemes can be implemented within the teachings of this invention.

One form of snapshot process includes the active file system (e.g., inodes and data blocks) at the primary server being captured and transmitted as a whole over a network (such as the Internet) to a remote storage destination site. Generally, a snapshot is an image, typically read-only, which is a replication of a volume at a point in time. The replicated image is initially stored on one or more storage devices on the primary server. After the snapshot is created and stored, the active file system is reestablished leaving the snapshot version in place for possible future restoration of the file system at previous points in time. The snapshot process is described in further detail in U.S. patent application Ser. No. 09/932,578, entitled INSTANT SNAPSHOT, by Blake Lewis et al., which is hereby incorporated by reference as though fully set forth herein, and in U.S. patent application Ser. No. 10/100,434 entitled SYSTEM AND METHOD FOR REDIRECTING ACCESS TO A REMOTE MIRRORED SNAPSHOT, by Raymond C. Chen et al., which is hereby incorporated by reference as though fully set forth herein.

As noted, it is often necessary to update the mirrored system when the active file system on the primary server experiences changes. Typically, a new snapshot of the entire file system is periodically generated and transmitted to each destination. However, it is desirable to transmit incrementally the changes to the file system, instead of the entire file system. In order to update incrementally each snapshot with current changes, the source volume is typically scanned at least one time for each destination that is mirrored in order to find the updates which have not yet been transmitted to that particular destination. This involves multiple scans of the source volume, which consume time and bandwidth of the volume and the server, and further requires keeping track of which version of the file system exists on each destination. Some systems, however, do not provide version support with respect to each data block of the file system and, therefore, it is difficult to determine which snapshot exists on each destination volume in the system.

Thus, there remains a need for a method and system for mirroring a source volume to multiple destinations which reduces the amount of scans performed on the volume while maintaining accurate information about which snapshot exists on the destination prior to attempted replication.

SUMMARY OF THE INVENTION

The present invention overcomes the disadvantages of the prior art by providing a technique for multiple destination mirroring in a distributed storage system environment comprising two or more volumes distributed across a plurality of nodes interconnected as a cluster. According to the invention, a mirroring application is configured to efficiently manage multiple destination mirroring of one or more flexible volumes which are replicas of the file system at a node, i.e., a primary server, which acts as a mirror source. In accordance with the invention, when a mirroring session is to commence, a snapshot is generated to provide an image of the active file system, to be distributed to the mirror destinations.

In accordance with an illustrative embodiment of the invention, a mirroring application running on the primary server configures a scanner which is a software object, which is executed by a thread in the storage operating system environment. The mirroring application further configures one or more sender modules ("senders"), each of which is associated with a destination in the mirroring environment. To initiate the replication, each sender queries its destination to request its reference snapshot. The sender, having thus been notified of the reference snapshot of the destination, registers the snapshot with the scanner. The scanner determines the oldest snapshot for the group of destinations in the mirror process and the scanner then calculates a logical age for each snapshot with the most recent snapshot being assigned an age equal to 1, and with progressively older snapshots being assigned 2, 3, etc. The scanner is further configured to scan the volume to be mirrored to the destinations for blocks that are newer than the oldest reference snapshot in the group. The scanner then tags each such block with a logical age that is equivalent to the oldest snapshot that refers to that block, and places the tagged blocks in a queue.

The sender module then inspects blocks in the queue and "filters" (discards) data blocks that are older than its reference snapshot because its destination already has those data blocks from prior replication processes. The sender retrieves those blocks that are younger than the destination reference snapshot. The sender then sends those blocks with an age more recent than the destination's reference snapshot to the destination. Thus, the destination is brought up to date with the current active file system without resending the entire contents of the file system snapshot. Techniques for baseline mirroring for a new destination are also described herein. Advantageously, the novel technique requires only one pass of the scanner through a flexible volume and does not require the scanner to repeatedly scan the volume for each destination to be updated.

BRIEF DESCRIPTION OF THE DRAWINGS

The above and further advantages of the present invention may be better understood by referring to the following description in conjunction with the accompanying drawings in which like reference numerals indicate identical or functionally similar elements:

FIG. 4 is a schematic block diagram illustrating the format of a cluster fabric (CF) message in accordance with an illustrative embodiment of the present invention;

FIG. 5 is a schematic block diagram of the format of a data container handle in accordance with an illustrative embodiment of the present invention;

DETAILED DESCRIPTION OF AN ILLUSTRATIVE EMBODIMENT

A. Cluster Environment

Figure 1:
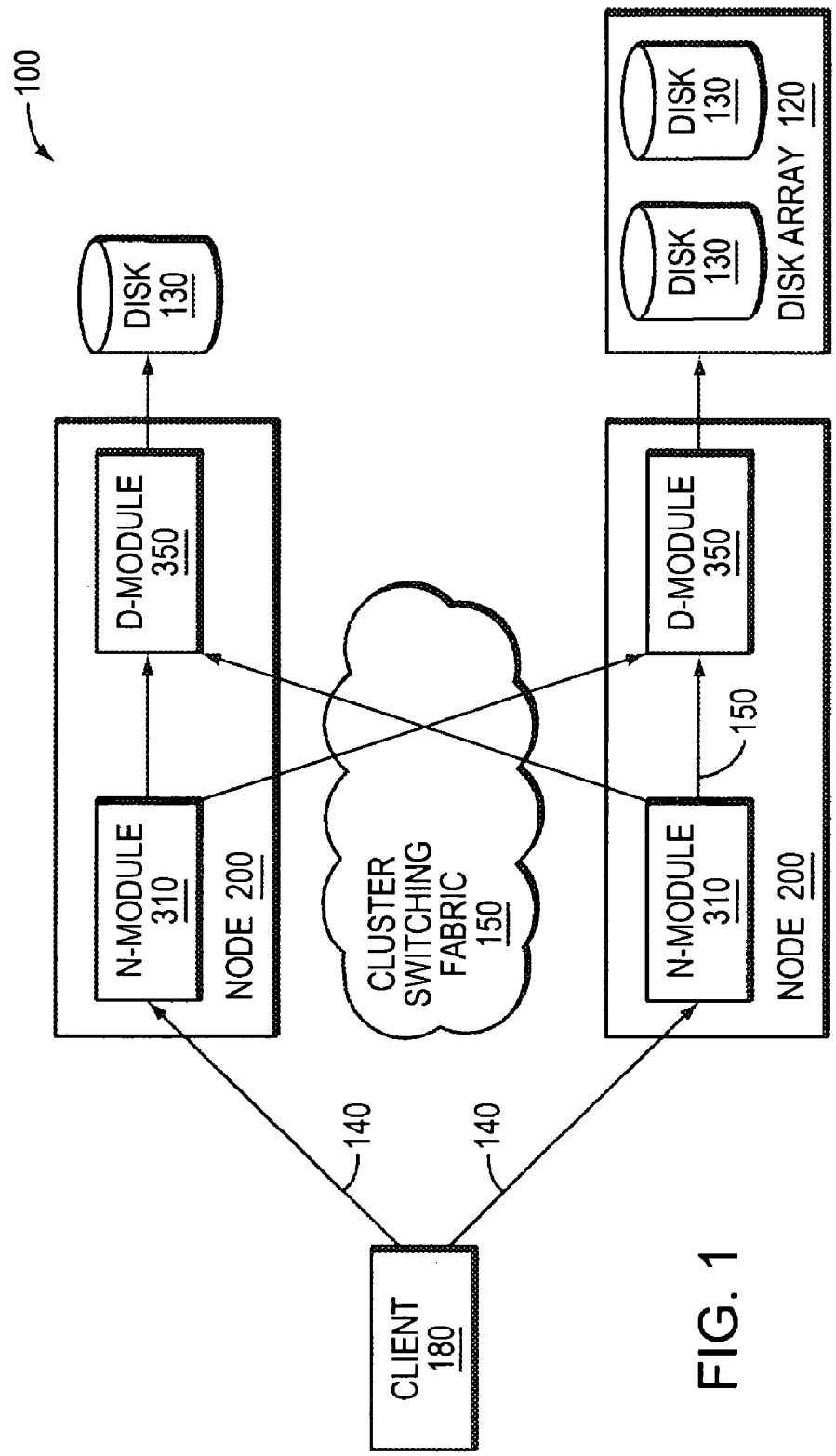
FIG. 1 is a schematic block diagram of a plurality of nodes interconnected as a cluster in accordance with an illustrative embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. The exemplary distributed file system architecture is generally described in U.S. Patent Application Publication No. US 2002/0116593 entitled METHOD AND SYSTEM FOR RESPONDING TO FILE SYSTEM REQUESTS, by M. Kazar et al. published Aug. 22, 2002.

It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only. In an alternate embodiment, each N or D-module in a distributed storage system environment may be referred to as a node of such environment.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP/IP (iSCSI) and SCSI encapsulated over Fibre Channel (FCP), when accessing information in the form of blocks.

B. Storage System Node

Figure 2:
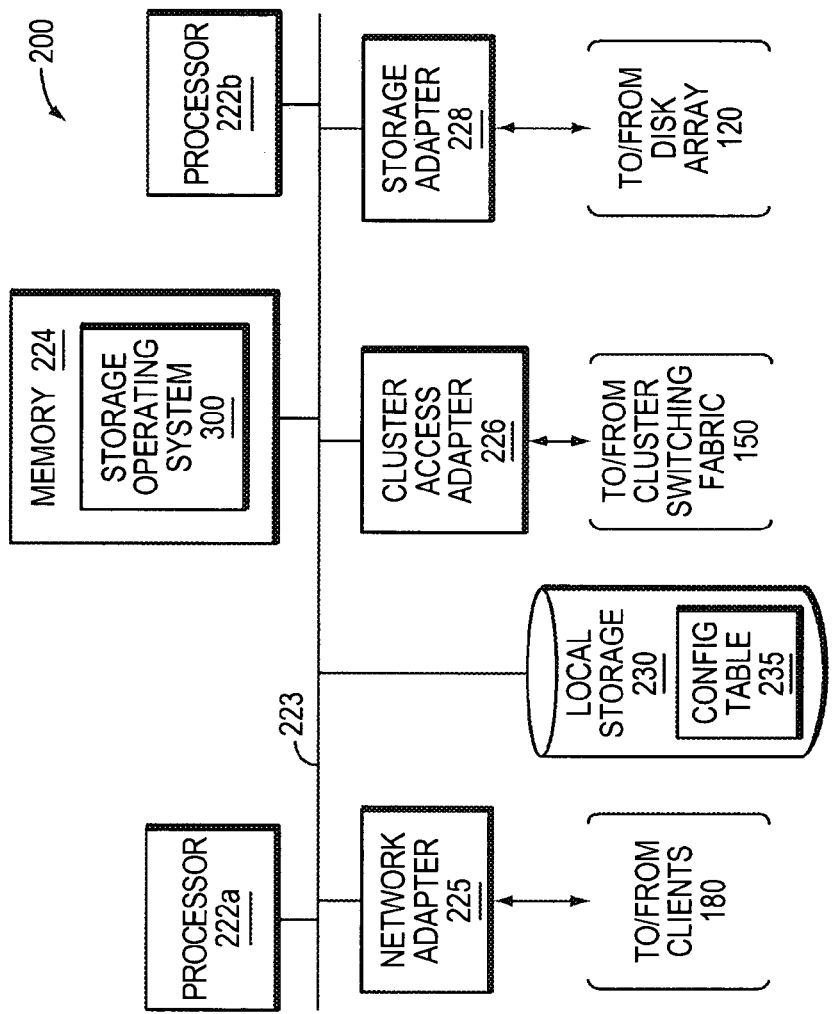
FIG. 2 is a schematic block diagram of a node in accordance with an illustrative embodiment of the present invention.

FIG. 2 is a schematic block diagram of an exemplary node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., of Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP®" is employed, it should be taken broadly to refer to any storage operating system that is otherwise adaptable to the teachings of this invention.

Figure 3:
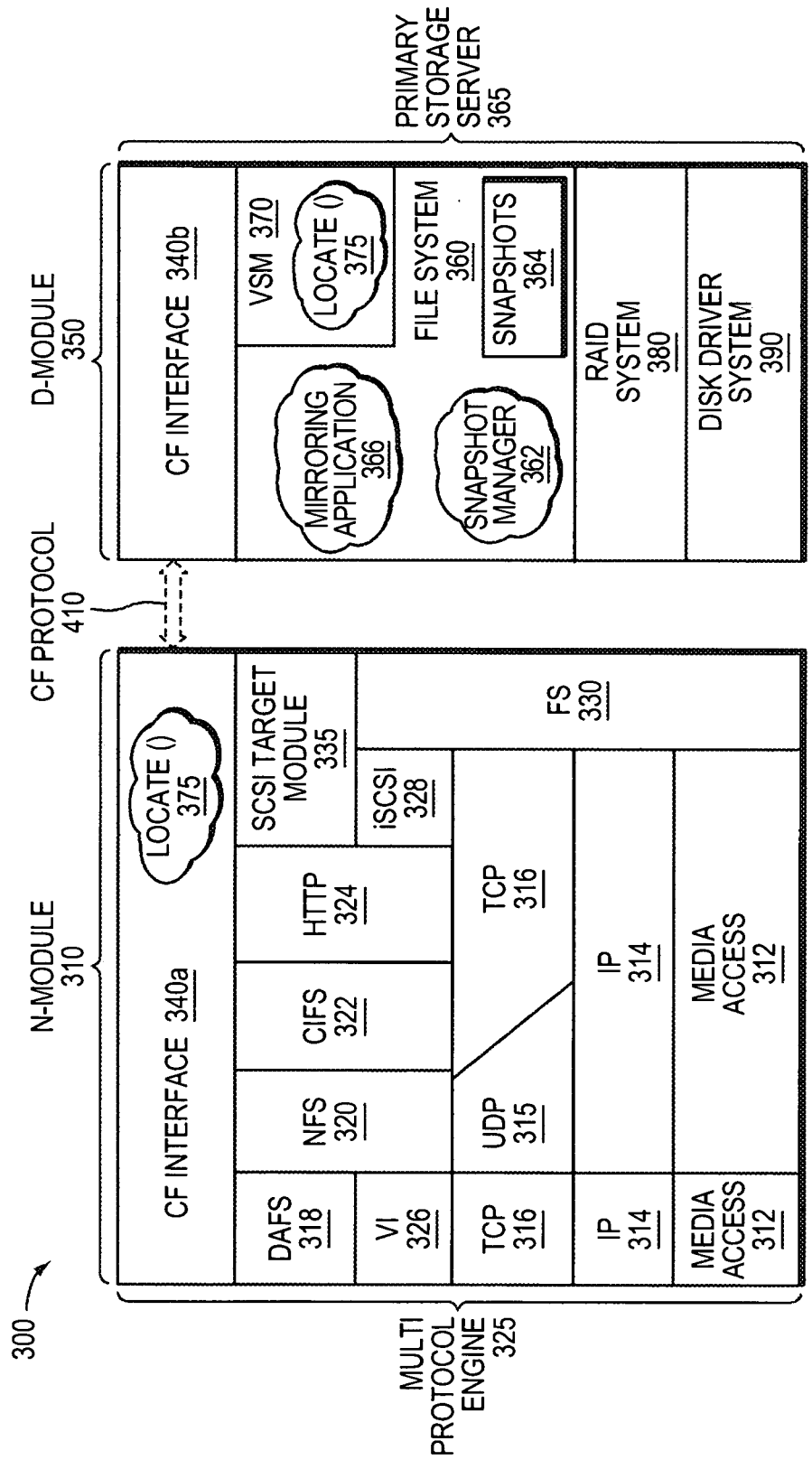
FIG. 3 is a schematic block diagram of a storage operating system that may be advantageously employed with an illustrative embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS). As described further herein, the VSM cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework (not shown), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring as discussed herein, and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

As described further herein, the file system 360 further includes a snapshot manager 362 that is configured to efficiently perform a snapshot process in which a snapshot of the active file system (e.g., inodes and blocks), at the storage system (primary server) is captured and stored in a snapshot storage area 364. By "active file system" it is meant the file system to which current I/O operations are being directed. Once a snapshot is obtained, the active file system is reestablished leaving the snapshot in place for possible future restoration. As used herein, a snapshot is an image (typically read-only) of the entire file system as it existed when the shapshot is taken. The snapshot is stored on the same primary server as is the active file system and is accessible by users of the active file system. The snapshot is also mirrored to mirror destinations in the multiple destination mirror environment.

The snapshots are also stored in the snapshot storage area 364. Notably, in the illustrative write-anywhere environment, when a block is to be edited, instead of editing that original block, a new block is created. Thus as snapshots are taken, the newly created blocks are captured in the new snapshots. Each block or file is said to be "owned" by a snapshot, and in particular, in the illustrative example, each block is owned by the first snapshot in which it appeared, i.e., the oldest snapshot that contains that block or file.

The file system 360 also contains a mirroring application 366, the details of which are described further herein. The mirroring application contains various components which cooperate with the snapshot manager 362 to send a snapshot to each mirror destination and to thereafter update each destination incrementally with newly created blocks have yet to be received by the particular destination by way of, e.g., replication. This process is described in further detail hereinafter.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, and a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340a,b adapted to implement intra-cluster communication among the modules, as well as D-module-to-D-module communications, for data container striping operations, for example.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the N-module and D-module although, in the case of remote communication between an N-module and D-module of different nodes, such message passing occurs over the cluster switching fabric 150. A known message-passing mechanism provided by the storage operating system to transfer information between N-modules and D-modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system command messages, including novel mirroring command messages described herein, among the modules of cluster 100. For example, the mirroring application communicates with the snapshot manager using the CF protocol. Additionally, the mirroring application 366 running on the primary server configures one or more sender modules ("senders") which communicate with remote D-modules using the CF protocol.

Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands, including the mirroring commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

A data container, e.g., a file, is accessed in the file system using a data container handle. FIG. 5 is a schematic block diagram illustrating the format of a data container handle 500 including a SVS ID field 502, an inode number field 504, a unique-ifier field 506, a striped flag field 508 and a striping epoch number field 510. The SVS ID field 502 contains a global identifier (within the cluster 100) of the SVS within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields. The striped flag field 508 is illustratively a Boolean value that identifies whether the data container is striped or not. The striping epoch number field 510 indicates the appropriate striping technique for use with this data container for embodiments where the SVS utilizes differing striping techniques for different data containers. Further details about an illustrative file system organization can be found in commonly-owned U.S. patent application Ser. No. 11/119,278, filed on Apr. 29, 2005, of Kazar, et al., for a STORAGE SYSTEM ARCHITECTURE FOR STRIPING DATA CONTAINER CONTENT ACROSS VOLUMES OF A CLUSTER, which is incorporated by reference herein in its entirety.

E. File System Organization

Figure 6:
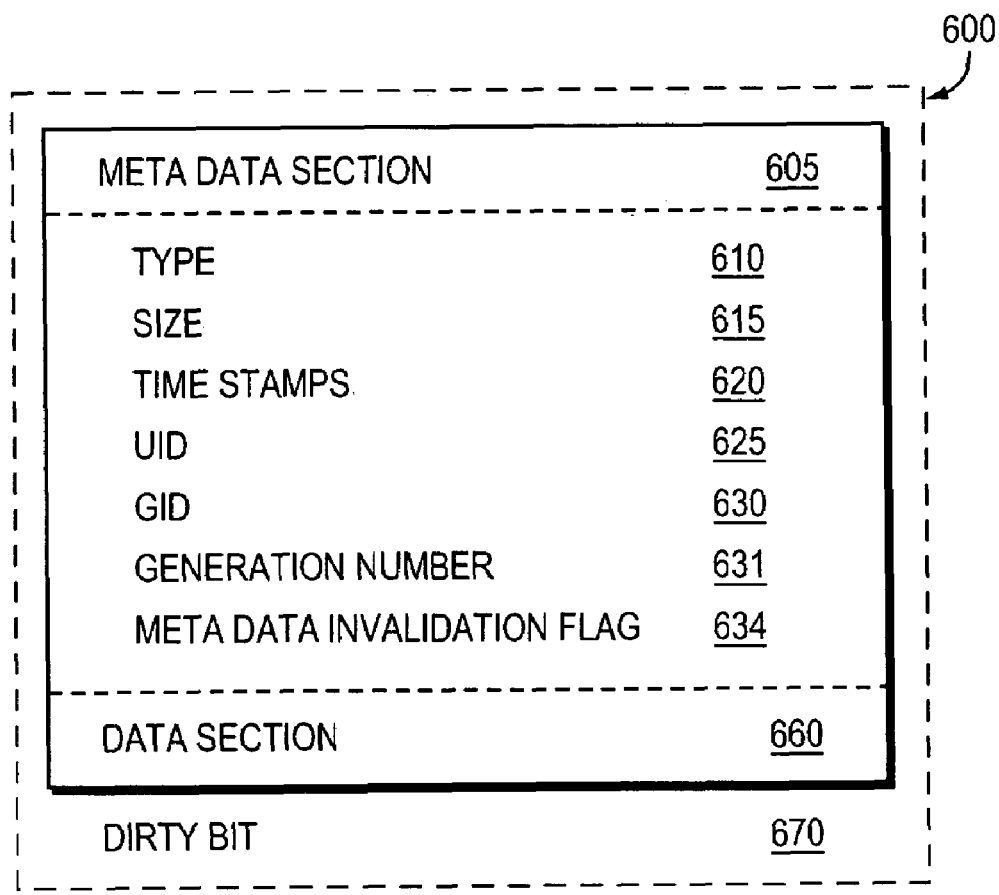
FIG. 6 is a schematic block diagram of an exemplary inode in accordance with an illustrative embodiment of the present invention.

In the illustrative embodiment, a data container is represented in the write-anywhere file system as an inode data structure adapted for storage on the disks 130. FIG. 6 is a schematic block diagram of an inode 600, which preferably includes a meta-data section 605 and a data section 660. The information stored in the meta-data section 605 of each inode 600 describes the data container (e.g., a file) and, as such, includes the type (e.g., regular, directory, vdisk) 610 of file, its size 615, time stamps (e.g., access and/or modification time) 620 and ownership, i.e., user identifier (UID 625) and group ID (GID 630), of the file. The meta-data section 605 also includes a generation number 631, and a meta-data invalidation flag field 634. The contents of the data section 660 of each inode may be interpreted differently depending upon the type of file (inode) defined within the type field 610. For example, the data section 660 of a directory inode contains meta-data controlled by the file system, whereas the data section of a regular inode contains file system data. In this latter case, the data section 660 includes a representation of the data associated with the file.

Specifically, the data section 660 of a regular on-disk inode may include file system data or pointers, the latter referencing 4 kB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 kB, then the data section of the inode (e.g., a first level inode) comprises up to 16 pointers, each of which references a 4 kB block of data on the disk.

Moreover, if the size of the data is greater than 64 kB but less than or equal to 64 megabytes (MB), then each pointer in the data section 660 of the inode (e.g., a second level inode) references an indirect block (e.g., a first level L1 block) that contains 1024 pointers, each of which references a 4 kB data block on disk. For file system data having a size greater than 64 MB, each pointer in the data section 660 of the inode (e.g., a third level L3 inode) references a double-indirect block (e.g., a second level L2 block) that contains 1024 pointers, each referencing an indirect (e.g., a first level L1) block. The in-direct block, in turn, that contains 1024 pointers, each of which references a 4 kB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 7:
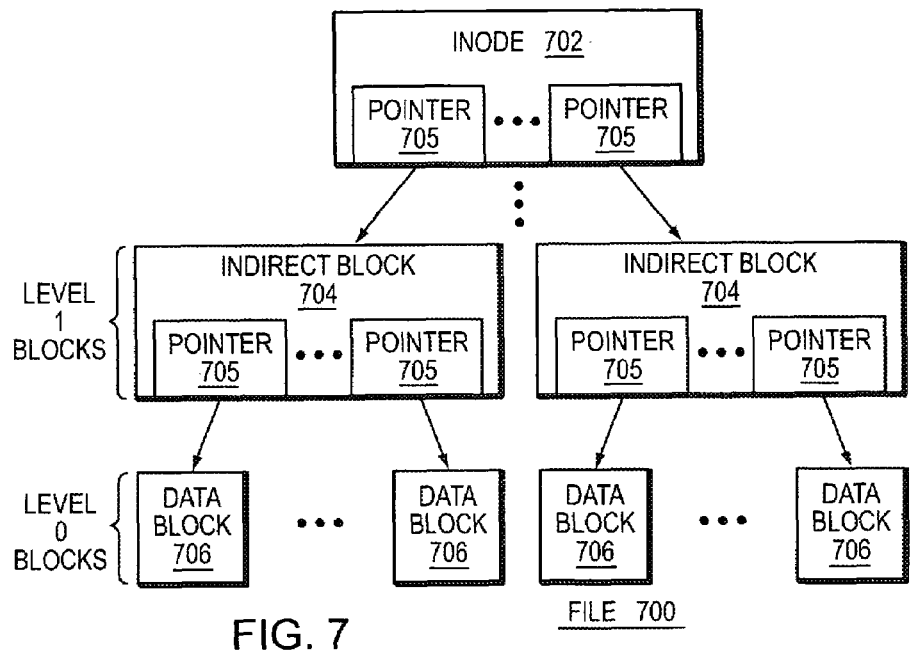
FIG. 7 is a schematic block diagram of an exemplary buffer tree in accordance with an illustrative embodiment of the present invention.

FIG. 7 is a schematic block diagram of an embodiment of a buffer tree of a file that may be advantageously used with the present invention. The buffer tree is an internal representation of blocks for a file (e.g., file 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. patent application Ser. No. 10/836,817 titled EXTENSION OF WRITE ANYWHERE FILE SYSTEM LAYOUT, by John K. Edwards et al. and assigned to Network Appliance, Inc. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an mode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk, dbn occurs at the file system/RAID system boundary of the storage operating system 300.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks.

Figure 8:
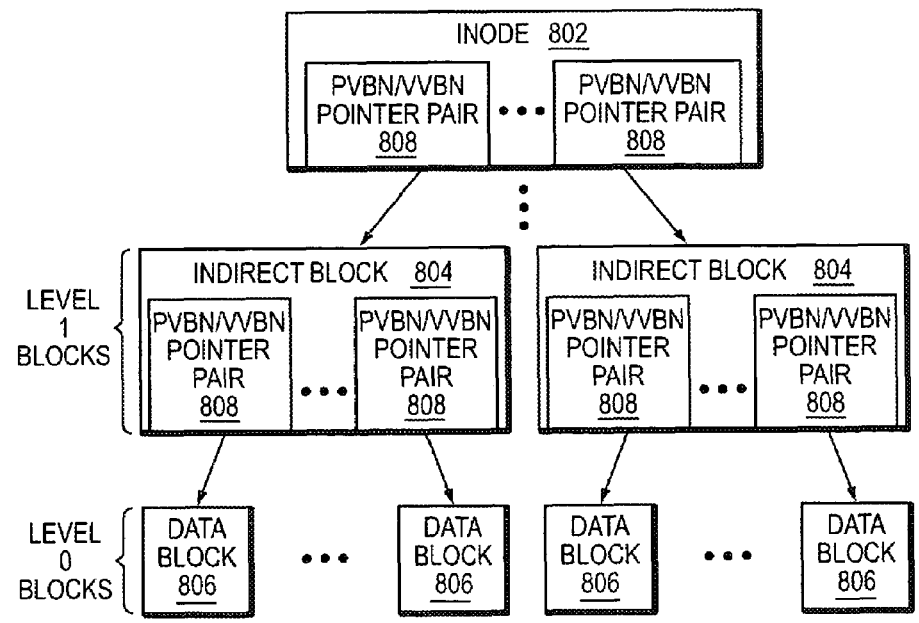
FIG. 8 is a schematic block diagram of an illustrative embodiment of a buffer tree of a file that may be advantageously used with the present invention.

FIG. 8 is a schematic block diagram of an illustrative embodiment of a buffer tree of a file 800 that may be advantageously used with the present invention. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pvbn/vvbn pointer pair structures 808 that ultimately reference data blocks 806 used to store the actual data of the file.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 9:
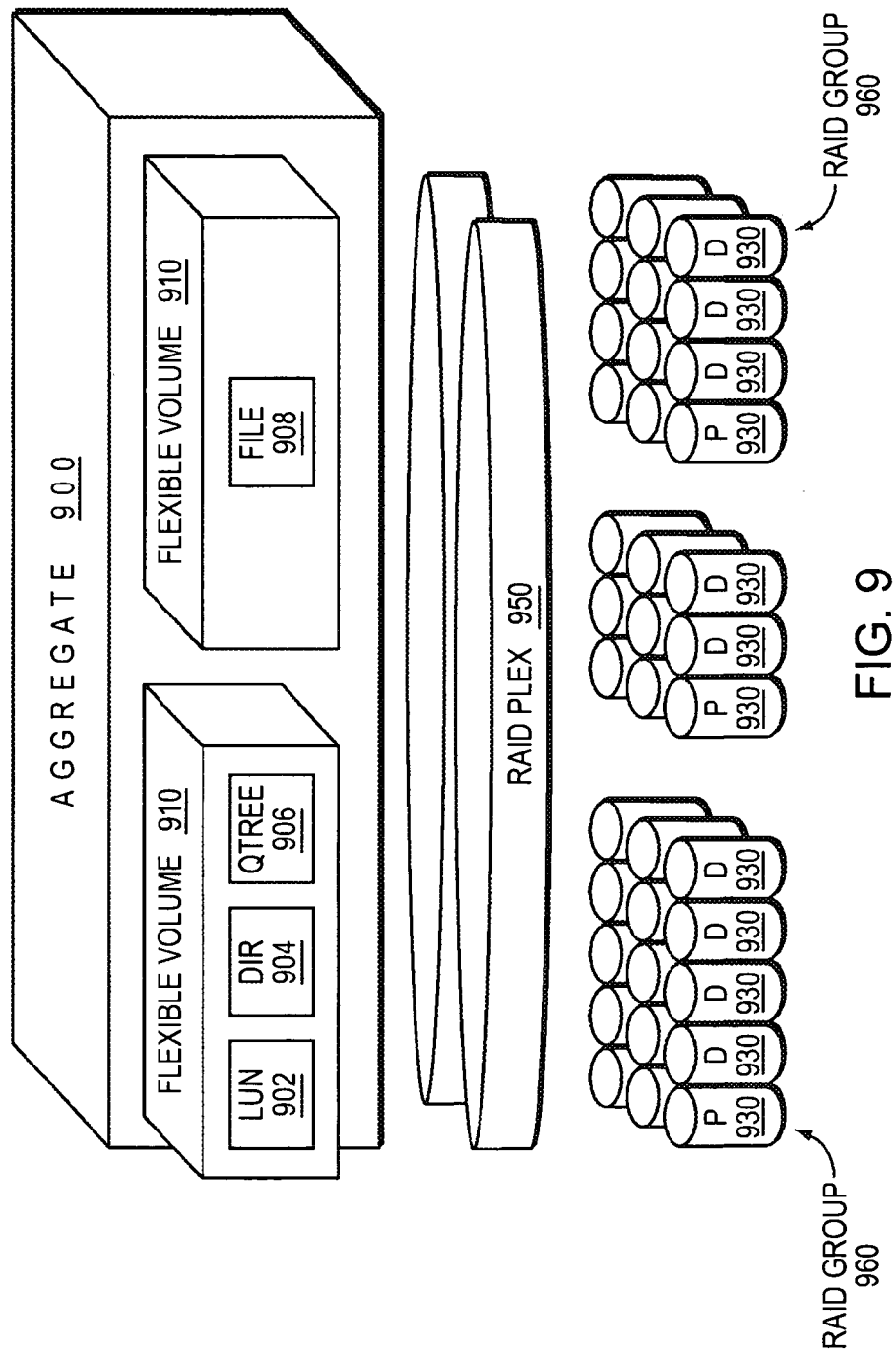
FIG. 9 is a schematic block diagram of an aggregate in accordance with an illustrative embodiment of the present invention.

FIG. 9 is a schematic block diagram of an aggregate 900 in accordance with an illustrative embodiment of the present invention. Luns (blocks) 902, directories 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a file system file and a storage label file. The storage label file is illustratively a 4 kB file that contains meta-data similar to that stored in a conventional RAID label. In other words, the storage label file is the analog of a RAID label and, as such, contains information about the state of the flexible volume such as, e.g., the name of the flexible volume, a universal unique identifier (uuid) and fsid of the flexible volume, whether it is online, being created or being destroyed, etc. For further details regarding the aggregate are provided in U.S. patent application Ser. No. 11/119,278, entitled STORAGE SYSTEM ARCHITECTURE FOR STRIPING DATA CONTAINER CONTENT ACROSS VOLUMES OF A CLUSTER, filed Apr. 29, 2005 by Michael Kazar et al., which is incorporated herein by reference in its entirety.

Figure 10:
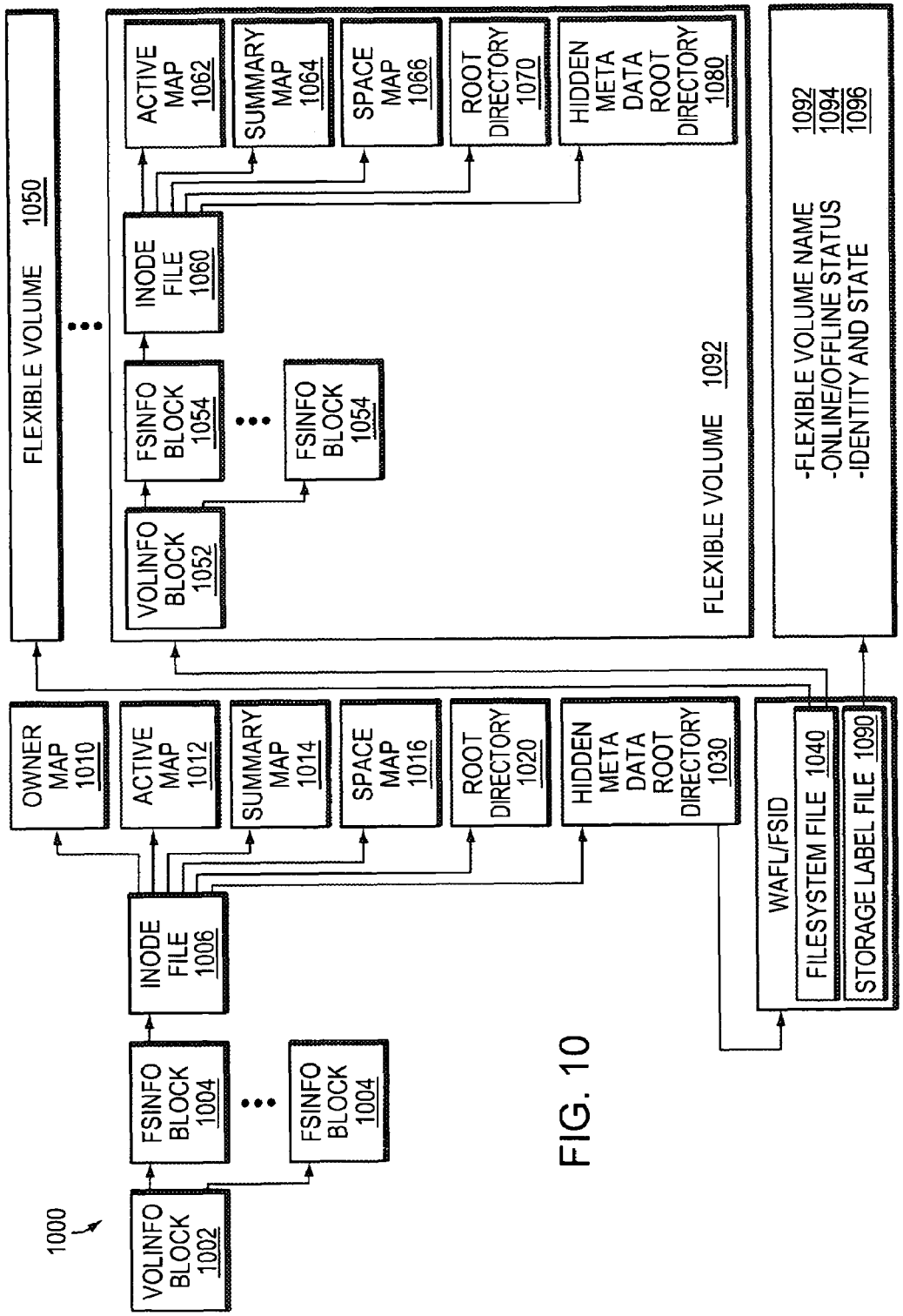
FIG. 10 is a schematic block diagram of an exemplary on-disk layout of the aggregate in accordance with an embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate. The volinfo block 1002 contains block pointers to fsinfo blocks 1004, each of which may represent a snapshot of the aggregate. Each fsinfo block 1004 includes a block pointer to an inode file 1006 that contains inodes of a plurality of files, including an owner map 1010, an active map 1012, a summary map 1014 and a space map 1016, as well as other special meta-data files. The inode file 1006 further includes a root directory 1020 and a "hidden" meta-data root directory 1030, the latter of which includes a namespace having files related to a flexible volume in which users cannot "see" the files. The hidden meta-data root directory includes the WAFL/fsid/directory structure that contains file system file 1040 and storage label file 1090. Note that root directory 1020 in the aggregate is empty; all files related to the aggregate are organized within the hidden meta-data root directory 1030.

In addition to being embodied as a container file having level 1 blocks organized as a container map, the file system file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystem file, storage label file directory structure in a hidden meta-data root directory 1080. To that end, each flexible volume 1050 has a volinfo block 1052 that points to one or more fsinfo blocks 1054, each of which may represent a snapshot, along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct inode space with corresponding inode numbers, as well as its own root (fsid) directory 1070 and subdirectories of files that can be exported separately from other flexible volumes.

The storage label file 1090 contained within the hidden meta-data root directory 1030 of the aggregate is a small file that functions as an analog to a conventional raid label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed).

F. Mirroring Application

Figure 11A:
FIGS. 11A-11C illustrate a simplified version of a flexible volume in an illustrative mirroring environment in which the techniques of the present invention can be advantageously employed.
Figure 11B:
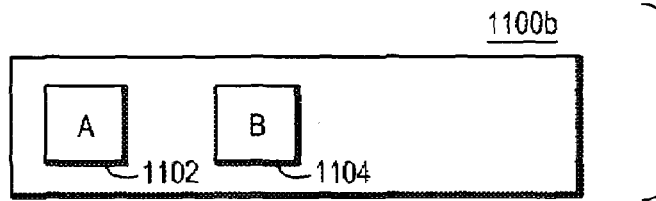
Figure 11C:
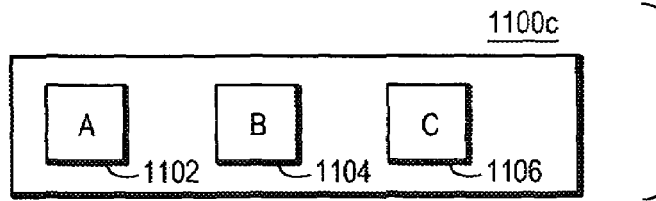

By way of further background, FIGS. 11A-11C illustrate a simplified version of a flexible volume 1100a in an illustrative mirroring environment in which the technique of the present invention can be advantageously employed. To begin a mirroring session, a snapshot is taken of the entire active file system and is referred to as snapshot A. Illustratively, snapshot A includes block 1102 of a file. Subsequently, when a portion of the file is to be written to, the original block 1102 containing that portion is not overwritten. Instead, in the write-anywhere file system of the illustrative embodiment of the invention, a second block 1104 is created and stored as a new data block in the flexible volume. In the example, a next snapshot of the flexible volume (now 1100b) is taken and this next snapshot, snapshot B, includes the newly created block 1104. Further in accordance with the illustration of FIG. 11C, another block 1106 is created. Later, a new snapshot is taken of the active file system 1100c and this new snapshot C includes block 1106.

Figure 11D:
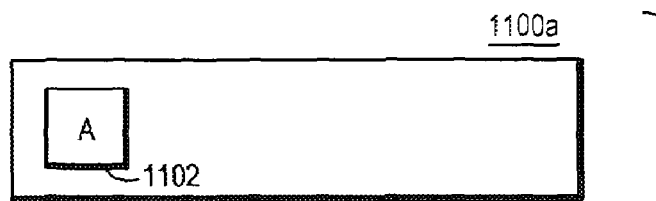
FIGS. 11D and 11E illustrate replication of the volume of FIGS. 11A-11C being mirrored to a remote destination.
Figure 11E:
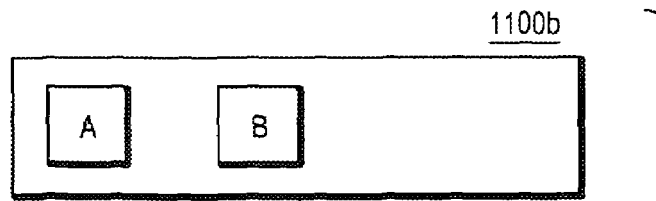

Assume further that the flexible volume is mirrored to destination X and destination Y. FIGS. 11D and 11E are schematic illustrations of a replication of the volume of FIGS. 11A-11C being mirrored to a remote destination. Further yet, assume that the volume 1100a as it existed in snapshot A is mirrored to destination X and destination Y. Accordingly, each it is thus said that destination X has a reference snapshot of snapshot A and destination Y also has snapshot A as its reference snapshot. At a later point in the replication process, the volume 1100*b* is to be mirrored to destination X and destination Y. However, the mirroring to destination X fails. Thus, destination X still has a reference snapshot of snapshot A as shown in FIG. 11D, yet destination Y is at a reference snapshot of snapshot B, as shown in FIG. 11E.

Figure 12:
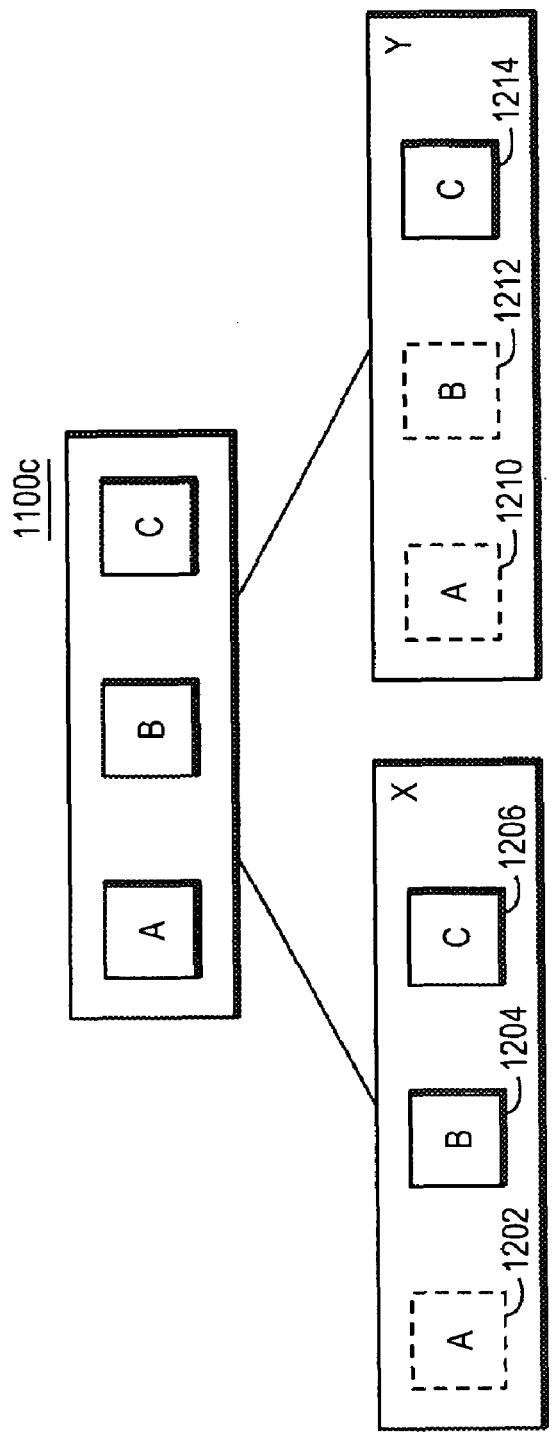
FIG. 12 is a schematic illustration of a replication of a volume being mirrored to a remote location subsequent to the replication process of FIGS. 11D and 11E.

Now, assume that the replication process is to be performed yet again, and the destinations X and Y are to receive an updated mirror of the volume 1100*c* from the primary server and the most current snapshot is snapshot C. However, it is noted that in the example, the destinations have different reference snapshots. This can be better understood with reference to FIG. 12 which is a schematic illustration of a replication of a volume being mirrored to a remote location subsequent to the replication process of FIGS. 11D and 11E of the volume 1100*c* in the environment of FIG. 11C. The volume is represented in the example of 1100*c* as containing snapshots A, B and C. In order to bring the mirror destinations to the same state, all of the snapshots could be sent to each destination, however, it would be more efficient to perform the replication process incrementally such that only the new blocks are sent to the destinations. This means that destination X (which is at reference snapshot A) needs to receive any new blocks from snapshots B and C. Note that snapshot A is shown as dashed-line block 1202 because it already resides on destination X, while newly created blocks associated with snapshots B and C are shown as solid-line blocks 1204 and 1206, respectively; these newly-created blocks are thus sent to destination X in this round of replication. Destination Y, which already has snapshot A shown in dashed-line block 1210 and already has new blocks from snapshot B shown in dashed-line block 1212, only needs to receive the newly created blocks from snapshot C, shown as solid-line block 1214.

In accordance with the present invention, such incremental mirroring can be performed without repeatedly scanning the volume to determine which blocks are to be sent to which destinations. To that end, it is noted that each data block has a block "owner" such that the owner of the block is the oldest snapshot which refers to it. Based upon this concept of block ownership, the present invention assigns a logical age to each snapshot and thus to each block owned by that snapshot. Illustratively, the ages are assigned as follows:

Active file system=0
First snapshot=3
Next snapshot=2
Most recent snapshot=1

Only those blocks of a certain age are then sent to the respective destinations. More specifically, the mirroring application configures a scanner and sender to carry out the following policy:

If the block's assigned age is greater than or equal to the destination's reference snapshot age, the block is filtered out and is not sent; and/or If the block's assigned age is less than the destination's reference snapshot age, then the block is sent to the destination.

Figure 13:
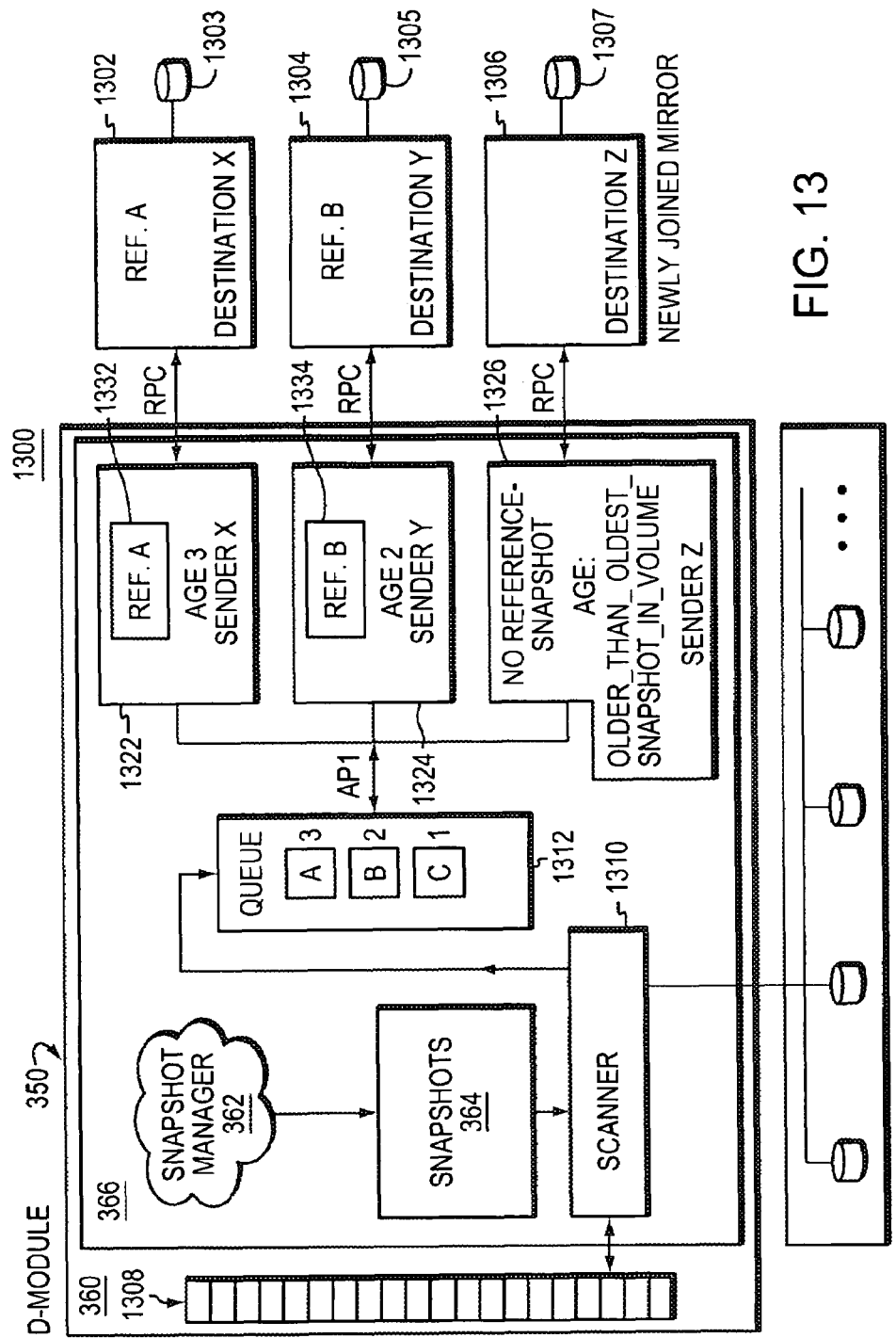
FIG. 13 is a schematic block diagram of a multiple destination mirroring environment in accordance with an illustrative embodiment of the present invention.

FIG. 13 is a schematic block diagram of a multiple destination mirroring environment 1300 in accordance with an illustrative embodiment of the present invention. D-module 350 is a primary server acting as a mirror source in the multiple destination mirroring environment 1300. The D-module 350 includes a file system 360 that cooperates with mirroring application 366 to replicate the file system to the remote destinations for purposes of, e.g., back up, disaster recovery and load balancing. More specifically, the active file system 360 is mirrored to remote destination X embodied as server 1302 that cooperates with a SVS designated by the disk 1303, destination Y embodied as server 1304 and SVS 1305, and destination Z embodied as server 1306 and SVS 1307.

As noted the file system 360 provides logical volume management capabilities for use in accessing information stored on storage devices associated with the D-module, such as for example, flexible volume 1308. The file system 360 also includes a snapshot manager 362 that manages creation of snapshots 364. The mirroring application 366 configures a scanner 1310 that also has access to the snapshots 364 that are to be mirrored to the destinations 1302, 1304, and 1306 under the direction of the mirroring application 366. Illustratively, the scanner 1310 is implemented as a software object, which is executed by a thread in the illustrative ONTAP® environment. The scanner thread is created when a new mirror session starts, and the thread is destroyed when the session is finished. The scanner thread can instead be allocated from a thread pool when a mirror session is started, which is then returned to thread pool when the session finishes. It should be understood that, as with the other modules and functions described herein, the scanner can alternatively be implemented in firmware or in hardware in other applications of the invention.

Illustratively, the mirroring application 366 configures the scanner 1310 with the following items of configuration information: the volume to be scanned (i.e. the source volume to be mirrored); the oldest reference snapshot among all the senders; the newly created snapshot which the mirror application creates for this mirror session (i.e., the latest snapshot); and the queue into which the generated data is to be loaded. Each of these functions is described in further detail herein. Based upon this configuration information, the scanner performs the following tasks: calculates the volume space to scan (i.e. vbn space); registers the snapshots of the volume between oldest reference snapshot and the latest snapshot; identifies the snapshots of the volume, and assigns the snapshot's logical age; and scans the snapshots in the order of oldest snapshot registered first, toward the latest snapshot.

More specifically, and referring to FIG. 13, the scanner scans the volume 1308 for newly created blocks. The scanner tags these blocks with a logical age, and places blocks into a queue 1312, which blocks are later to be sent to the destination by way of a sender module that is assigned to each destination. For example, sender module 1322 is assigned to and transmits blocks to mirror destination X, sender module 1324 is assigned to and transmits blocks to the mirror destination Y, and sender module 1326 is assigned to and transmits blocks to mirror destination Z in the manner described herein.

When a mirroring session is started, the mirror application creates a new snapshot, and uses it as the latest snapshot to be mirrored to the destination mirrors. For each mirror destination, the mirror application constructs a sender module. Each sender module queries the destination mirror module about its reference snapshot. If the destination mirror module reports it is a new destination that requires first time mirroring for this destination, the corresponding sender is recorded as "baseline" mirror. Otherwise, the sender for this destination records the destination mirror's reference snapshot information. Notably, a "reference snapshot" is the latest (most recent) snapshot on the destination mirror.

After mirroring the data to the destination successfully, the mirror destination is updated to have the latest snapshot in the most recent mirroring as its reference snapshot. For example, assume that upon initial configuration, snapshot A of the active file system stored on flexible volume 1308 is mirrored to destination X which then has a reference snapshot of snapshot A. Assume also that destination Y is instantiated subsequently and has a reference snapshot of snapshot B.

Illustratively, as file access requests are completed and data is written to the volume 1308, newly created blocks are added to the volume. Thus, when a further replication process is to be performed, only the newly created blocks need to be sent to the mirror destinations X and Y. When it is time to perform a replication, the mirror application creates a new snapshot of the active file system in order to capture the newly created blocks needed to be sent to the mirror destinations of X and Y. Instead of sending the entire newest snapshot of the complete file system, illustratively only those blocks that have been newly created (files that have been edited) as of each mirror destination's reference snapshot are sent to that mirror destination.

To that end, scanner 1310 of mirror source D-module is programmed to register the latest snapshot created by the mirror application 366. In addition, the scanner 1310 also is programmed to register the oldest reference snapshots of all the destination mirrors in the group as represented by the senders. In addition, it further registers all the snapshots between the above two snapshots, namely all of the snapshots that have occurred between the oldest reference snapshot and the new snapshot just taken for the mirroring process. If any of the destination mirrors are new to the system and thus need to have a transfer in baseline mode, the scanner will register all those snapshots that were created before the newly created latest snapshot. The scanner then calculates a logical age associated with each such snapshot, with the newly created latest snapshot being assigned an age equal to one.

Each sender will be tagged using the age of its own reference snapshot as well. If the destination mirror of the sender needs baseline mode mirroring because it has no data, it is assigned an age that is the oldest possible value in the system so that any blocks in the volume will have an age at least younger than that. This ensures the new destination mirror will receive all the blocks that the scanner produces.

The scanner then scans the flexible volume to search for newly created blocks. In order to identify newly created blocks, the scanner 1310 further inspects the block allocation structures for the flexible volume. This can be performed in a number of different ways. Illustratively, the scanner 1310 loads the inode of the snapshot's active bitmap 1012 (FIG. 10) file for that flexible volume. The block number (fbn) is calculated within the active bitmap file 1012 for the block using its vbn. After locating which bitmap block should contain the block's allocation information, the bitmap block is loaded into an associated buffer 1311 located within the scanner 1310. The contents are then examined to determine whether the corresponding bit is set or not. If the block's corresponding bit is set, then it is known that the block is allocated in the snapshot, otherwise, it is known that the block is not allocated in that snapshot. The scanner 1310 examines the snapshot's active bitmap in the order of from oldest snapshot toward the more recent snapshots which are registered with the scanner. Once a snapshot is taken, a particular block in question is allocated in the active bitmap 1012 of that snapshot. Thus, as soon as a snapshot it reached that has that bit allocated for the particular block, it is known that this snapshot is the oldest owner of that block.

The scanner 1310 then assigns an age to that block corresponding to the block ownership as determined in the manner just described. The oldest snapshot in the set will have the highest number, working down to the most recent snapshot which, in accordance with an embodiment of the invention, is assigned the number 1. Thus, the scanner 1310 tags each block with a logical age in accordance with this paradigm.

If the block's age is the same as the oldest reference snapshot registered with scanner, the block is discarded by the scanner, because all the destinations should already have this block. For blocks whose age is younger than the oldest reference snapshot, the scanner 1310 then loads tagged blocks into queue 1312 where they are stored for transmission to each destination as required. In the illustrative example, blocks belonging to the original baseline snapshot age are assigned an age of 3, i.e., the relative age of snapshot A. Blocks which are owned by the next snapshot B, for example, are assigned an age of 2, i.e., the relative age of snapshot B. Further, newer blocks which are even younger than those owned by snapshot B belong to snapshot C and are assigned an age of 1, as snapshot C in the example is the most recent snapshot and as such is assigned an age of 1.

During a mirror operation, sender X 1322, for example, queries destination X to determine its reference snapshot. Sender 1322 saves that information in its own local memory, as illustrated by the block 1332. Similarly, the sender Y 1324 queries its destination 1304 and stores its reference snapshot as illustrated by the block 1334.

Assume for example that destination X has a reference snapshot of snapshot A, and destination Y has a reference snapshot of snapshot B. The destination Z 1306 is later added to the multiple destination mirror environment. In a replication process, snapshot C is created. Scanner 1310 is configured to search for the following snapshots: the latest snapshot C, and snapshot A and snapshot B, because destination Z needs baseline mirror for the first time mirroring.

Sender X is aware that destination X has not received snapshot B or snapshot C and thus sends blocks subsequent to reference snapshot A to destination X in order to update destination X with current changes. When sender Y performs its replication process, it has been notified that destination Y has a reference of snapshot B. Thus, destination Y already has blocks owned by snapshot B, so it only requires blocks owned by snapshot C in order to be current. Sender Z is aware that it is in baseline mirroring mode, thus it needs all the blocks in snapshot A, B, C to send to the destination.

In order to hasten this determination, the age of the block as tagged by the scanner is checked by the sender. Sender X is tagged by its reference snapshot A's age. Sender Y is tagged by its reference snapshot B's age. Sender Z has special age value, which is the oldest age possible in the system. In response to examining such a tagged block from the queue, the sender performs the following calculation: if a block's assigned age is greater than or equal to the sender's reference snapshot age, the block is filtered out and is not sent; else, if a block's assigned age is less than the sender's reference snapshot age, then that block is sent to the destination. In this way, the volume is scanned once and the generated blocks are filtered by individual senders before sending them to the corresponding destination based on the relative age assigned by the scanner.

Figure 14:
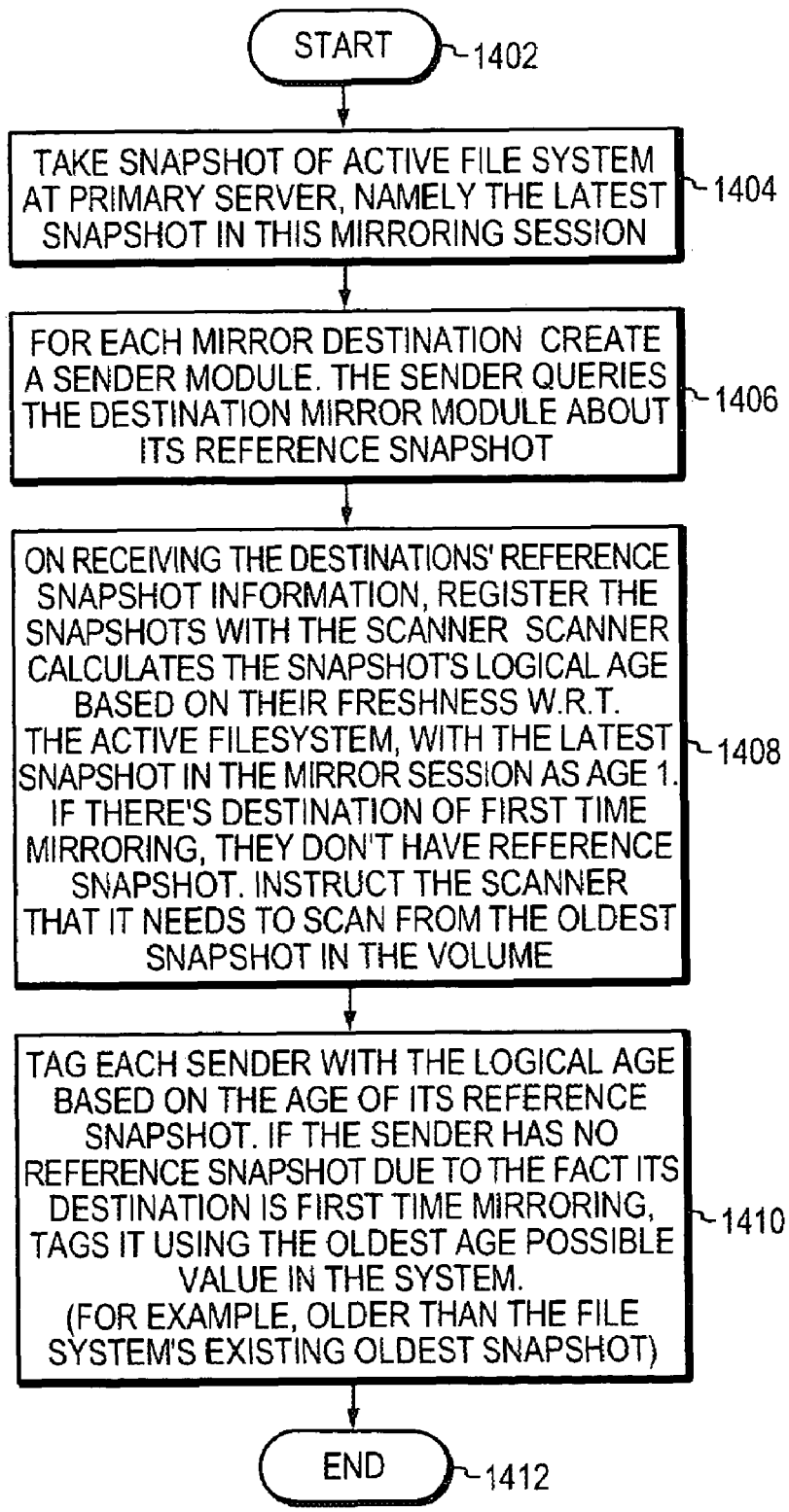
FIG. 14 is a flowchart illustrating a procedure for initial configuration of the multiple destination mirroring environment illustrated in FIG. 13.

FIG. 14 is a flowchart illustrating a procedure for initial configuration of the multiple destination mirroring environment when a mirroring session is to commence. The procedure starts at step 1402 and continues to step 1404 where initial configuration of the environment includes taking a snapshot of the active file system at the primary server, and this snapshot is thus the latest snapshot in this mirroring session. In step 1406, for each mirror destination, a sender module is created, and each sender module queries its destination mirror module about its reference snapshot. In step 1408, upon receiving the destination's reference snapshot information, the reference snapshots are then registered with the scanner; the scanner determines which of the reference snapshots is the oldest and then calculates the logical age of each snapshot based upon the snapshot's freshness with respect to the active file system, with the latest snapshot having an age of 1. It is noted that if there is a new destination that is undergoing a first time mirroring (such as for example, Destination Z in FIG. 13), that destination does not have a reference snapshot but instead is in baseline mirroring mode. In that case, the scanner is instructed to scan from the oldest snapshot in the volume.

In step 1410, each sender is tagged with a logical age based upon its reference snapshot (see FIG. 13). If the sender has no reference snapshot because it is in first time baseline mirroring, that sender is tagged with the oldest possible value in the system. The process ends at step 1412 and the system waits until the next replication process is to occur.

Figure 15:
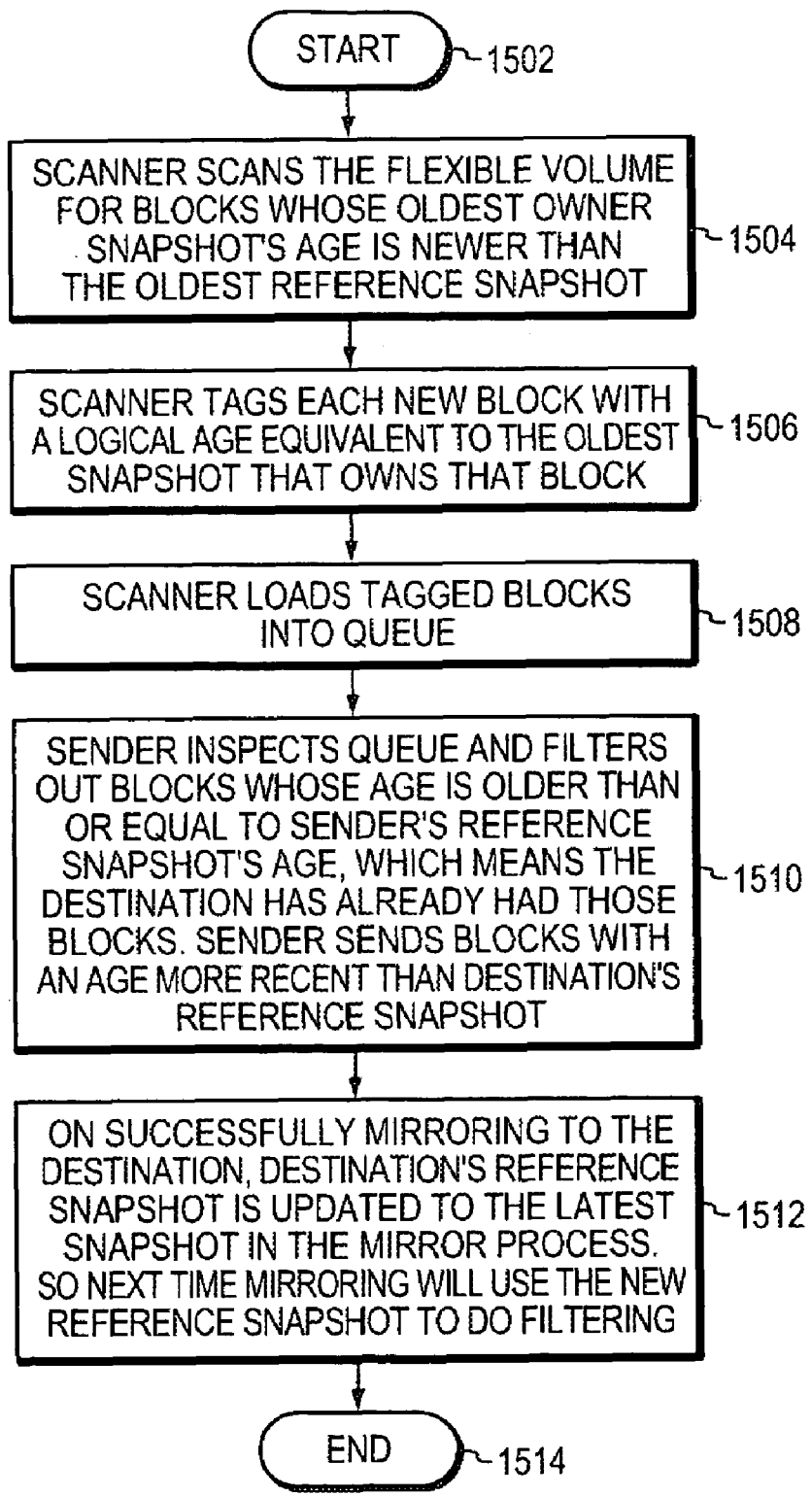
FIG. 15 is a flowchart illustrating a procedure for replication of updated data to each destination in the multiple destination mirror environment of the present invention.

FIG. 15 is a flowchart illustrating a procedure for replication of updated data to each destination in the multiple destination mirror environment of the present invention. The procedure begins at the start step, 1502 and proceeds to step 1504 in which the scanner scans the flexible volume to be mirrored to the destinations for blocks whose owner is newer than the oldest reference snapshot in the group. In step 1506, the scanner tags each such newer block with a logical age that is equivalent to the oldest snapshot that owns that block. (As noted with reference to FIG. 14, the scanner has already calculated the age of each snapshot with the most recent snapshot being assigned an age of one, and with progressively older snapshots assigned 2, 3, etc.). In step 1508, the scanner 1310 loads the tagged blocks in the queue 1312.

In step 1510, each sender inspects block in the queue and filters those blocks whose age is older than or equal to the sender's reference snapshot age, which means that the sender filters out blocks that the destination already has. The sender sends those blocks tagged with an age that is more recent than the reference snapshot. In step 1512, on successfully mirroring to the destination, the destination reference snapshot is updated to the latest snapshot in the mirroring process, such that the next time mirroring takes place, the sender will use the new reference snapshot to do the filtering. The procedure ends at step 1514.

It should be understood that this process requires only one pass of the scanner through a flexible volume and does not require the scanner to repeatedly scan the volume for each destination as it is updated. In this way, as noted, the volume is scanned only once and blocks are filtered by individual senders before sending them to the destination based on their relative ages assigned by the scanner. This aspect of the invention greatly reduces the I/O operations at the source volume when the source active file system is mirrored to multiple destinations, and can be used even when the destinations have different reference snapshots. The novel technique also does not require explicit data version support on the block level. This technique can further be used in volume copy and volume move operations to determine the difference between two file systems in replication.

The foregoing description has been directed to particular embodiments of this invention. It will be apparent however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-storage medium having program instructions, firmware, or a combination thereof. Therefore, it is the object of the appended claims to cover all such variations and modifications as come within the true spirit and scope of the invention.

What is claimed is:

1. A system for mirroring an active file system of a primary server to one or more destinations in a distributed storage system environment, the system comprising:

a volume of the primary server, the volume having one or more data blocks;

a snapshot manager running on the primary server configured to create one or more snapshots of the active file system, with each data block in a snapshot being owned by the oldest snapshot in which it appeared; and a mirroring application running on the primary server, said mirroring application configuring a sender module associated with each destination, said sender module configured to query its destination for information about a reference snapshot for that destination, and said mirroring application also configuring a scanner to register each snapshot of which it is notified by each sender and to find the oldest snapshot in a group of destinations in a mirror process, and assigning a logical age to each snapshot, said scanner being further configured to scan said volume to inspect its data blocks, and to select data blocks that are newer than the oldest reference snapshot in the group and to tag those blocks with a logical age corresponding with the age of the snapshot that owns that data block.

2. The system as defined in claim 1 further comprising:

a queue associated with said scanner, said queue storing data blocks tagged by said scanner; and said sender modules being further configured to inspect data blocks in said queue and to filter blocks older than an assigned logical age and to select data blocks from said queue of a predetermined logical age and to send those blocks to its associated destination server to configure said destination server as a mirror of the primary server.

3. The system as defined in claim 1 wherein said scanner is a software object that is executed by a thread in an operating system in the primary server.

4. The system as defined in claim 1 further comprising:

a cluster fabric protocol for application program interface communications between said snapshot manager and said mirroring application, and between said mirroring application and said scanner and said senders.

5. The system as defined in claim 4 wherein said cluster fabric protocol also includes messaging protocols for communication between said senders and said destination servers.

6. A method of mirroring data in a distributed storage system having an active file system to multiple destinations, the method including the steps of:
  creating a snapshot of the active file system being the latest snapshot in a mirroring session;
  for each mirror destination, configuring a sender module, said sender module querying its destination about its reference snapshot;
  on receiving its destination reference snapshot information, registering at said sender module the reference snapshot with a scanner;
  calculating at said scanner, the reference snapshot's logical age based upon its freshness with respect to the active file system, and determining the oldest snapshot in a group of destinations in the mirroring session being established; and
  tagging each snapshot with a logical age, with the latest snapshot in the mirror session as age 1.

7. The method as defined in claim 6 including the further steps of:
  mirroring data to the destinations including:
  scanning a flexible volume for data blocks whose snapshot owner's age is newer than said oldest reference snapshot in the group of destinations in the mirroring session; and
  tagging such blocks with a logical age related to the snapshot owner of that block.

8. The method as defined in claim 7 including the further step of loading tagged data blocks in a queue.

9. The method as defined in claim 8 including the further steps of:
  inspecting at sender module said blocks in said queue;
  filtering data blocks in said queue that are of a logical age that is older than or equal to the destination server's reference snapshot; and
  selecting data blocks from said queue that are of a logical age that is less than the destination server's reference snapshot, and sending said data blocks to said destination server.

10. The method as defined in claim 7 further comprising the step of identifying a new destination that requires baseline mirroring and assigning the new destination a predefined value that is older than the oldest snapshot in the volume.

11. The method as defined in claim 7 wherein said volume is scanned a single time to select blocks of said predetermined age.

12. A computer storage medium for mirroring data in a distributed storage system having multiple destinations, comprising program instructions for performing the steps of:
  creating a snapshot of the active file system being the latest snapshot in a mirroring session;
  for each mirror destination, configuring a sender module, said sender module querying its destination about its reference snapshot;
  on receiving its destination reference snapshot information, registering at said sender module the reference snapshot with a scanner;
  calculating at said scanner, the reference snapshot's logical age based upon its freshness with respect to the active file system, and determining the oldest snapshot in a group of destinations in the mirroring session being established; and
  tagging each snapshot with a logical age, with the latest snapshot in the mirror session as age 1.

13. The computer readable medium as defined in claim 12 comprising further program instructions for performing the steps of:
  mirroring data to the destinations including:
  scanning a flexible volume for data blocks whose snapshot owner's age is newer than said oldest reference snapshot in the group of destinations in the mirroring session; and
  tagging such blocks with a logical age related to the snapshot owner of that block.

14. The computer readable medium as defined in claim 13 comprising further program instructions for performing the steps of:
  loading tagged data blocks in a queue;
  inspecting at sender module said blocks in said queue;
  filtering data blocks in said queue that are of a logical age that is older than or equal to the destination server's reference snapshot; and
  selecting data blocks from said queue that are of a logical age that is less than the destination server's reference snapshot, and sending said data blocks to said destination server.

15. The computer readable medium as defined in claim 12 comprising further program instructions for performing the steps of identifying a new destination that requires baseline mirroring and assigning the new destination a predefined value that is older than the oldest snapshot in the volume.

16. The computer readable medium as defined in claim 12 comprising further program instructions for performing the step of scanning said volume a single time to inspect and tag said data blocks.

17. A system for mirroring an active file system of a primary server to one or more destinations in a distributed storage system environment, the system comprising:
  means for creating a snapshot of the active file system being the latest snapshot in a mirroring session;
  means, at each mirror destination, for configuring a sender module, said sender module querying its destination about its reference snapshot;
  means for, at each sender on receiving its destination reference snapshot information, registering at said sender module the reference snapshot with a scanner;
  means for calculating at said scanner, the reference snapshot's logical age based upon its freshness with respect to the active file system, and determining the oldest snapshot in a group of destinations in the mirroring session being established; and
  means for tagging each snapshot with a logical age, with the latest snapshot in the mirror session as age 1.

18. The system as defined in claim 17 further comprising:
  means for storing tagged data blocks in a queue;
  means for configuring a sender module to be associated with each destination server for querying the associated destination server to determine a reference snapshot for that destination server;
  means for filtering at said sender module data blocks in said queue that are of a logical age that is greater than or equal to the destination server's reference snapshot; and
  means for selecting by said sender module data blocks from said queue that are of a logical age that is less than the destination server's reference snapshot, and sending said data blocks to said destination server.

19. The system as defined in claim 17 further comprising means for identifying a new destination that requires baseline mirroring and assigning the new destination a predefined value that is older than the oldest snapshot in the volume.

20. The system as defined in claim 17 further comprising means for scanning said volume a single time to inspect and tag said data blocks.

21. The system as defined in claim 17 further comprising means for sending messages in accordance with a cluster fabric protocol between said primary server and said sender modules.

22. The system as defined in claim 17 further comprising means for sending messages in accordance with a cluster fabric protocol between each said sender module and its associated destination server.

23. A method of assigning an age to a data block with reference to a given snapshot, comprising the steps of:

loading at a scanner an inode of the given snapshot's active bitmap file for a flexible volume;

calculating a block number within the active bitmap file of the data block using its volume block number;

locating a bitmap block that contains the block's allocation information;

loading the bitmap block into an associated buffer;

examining the bitmap block's contents to determine whether a corresponding bit for the data block is set or not and if the data block's corresponding bit is set, then the block is allocated in the snapshot, if not, the block is not allocated in that snapshot; and assigning an age to the data block corresponding to the age of the first snapshot in which the block is allocated.

* * * * *